United States Patent
Warke et al.

(10) Patent No.: US 11,375,429 B2
(45) Date of Patent: Jun. 28, 2022

(54) WIRELESS CHIP-TO-CHIP SWITCHING

(71) Applicant: Texas Instruments Incorporated, Dallas, TX (US)

(72) Inventors: Nirmal Chindhu Warke, Irving, TX (US); Srinath Hosur, Plano, TX (US); Martin J. Izzard, Dallas, TX (US); Siraj Akhtar, Richardson, TX (US); Baher S. Haroun, Allen, TX (US); Marco Corsi, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/632,858

(22) Filed: Jun. 26, 2017

(65) Prior Publication Data

US 2017/0295533 A1    Oct. 12, 2017

Related U.S. Application Data (60) Continuation of application No. 13/901,814, filed on May 24, 2013, now Pat. No. 9,699,705, which is a
(Continued)

(51) Int. Cl.
*H04W 40/06* (2009.01)
*H04W 40/00* (2009.01)
(Continued)

(52) U.S. Cl.
CPC .......... *H04W 40/00* (2013.01); *H01Q 3/26* (2013.01); *H01Q 9/20* (2013.01);
(Continued)

(58) Field of Classification Search
CPC ..................................... H04W 40/06
See application file for complete search history.

(56) References Cited

U.S. PATENT DOCUMENTS

| | | | | |
|---|---|---|---|---|
| 6,424,658 | B1 * | 7/2002 | Mathur | H04L 45/00 370/412 |
| 6,697,619 | B1 * | 2/2004 | Hogberg | H04B 7/2041 455/12.1 |

(Continued)

OTHER PUBLICATIONS

Buoli, Carlo, et al., "A broadband microstrip to waveguide transition for FR4 multilayer PCBs up to 50 GHz," 32th European Microwave Conf., Sep. 2002, 4 pages.
(Continued)

*Primary Examiner* — Parth Patel
(74) *Attorney, Agent, or Firm* — Brian D. Graham; Charles A. Brill; Frank D. Cimino (57) ABSTRACT

Embodiments of the invention provide a system and method for chip to chip communications in electronic circuits. In one embodiment, a networking device includes an input port circuit having a transmitter circuit coupled one or more transmitter antennas, wherein the input port circuit transmits a data packet to a first output port circuit using millimeter wave signals. The networking device includes output port circuits including at least the first output port circuit, each of the output port circuits having a receiver circuit coupled to one or more receiver antennas. The networking device includes a beamforming circuit coupled to the one or more transmitter antennas of the input port circuit, wherein the beamforming circuit causes the one or more transmitter antennas to transmit an antenna beam directed at the one or more receiver antennas of the first output port circuit.

18 Claims, 9 Drawing Sheets

Related U.S. Application Data division of application No. 13/026,777, filed on Feb. 14, 2011, now Pat. No. 8,472,437.

(60) Provisional application No. 61/304,663, filed on Feb. 15, 2010.

(51) Int. Cl.

| | | |
|---|---|---|
| *H01Q 3/26* | (2006.01) | |
| *H01Q 21/00* | (2006.01) | |
| *H04L 49/00* | (2022.01) | |
| *H04L 49/40* | (2022.01) | |
| *H04B 17/336* | (2015.01) | |
| *H01Q 9/20* | (2006.01) | |
| *H04B 7/06* | (2006.01) | |
| *H04L 45/74* | (2022.01) | |
| *H04W 40/12* | (2009.01) | |

(52) U.S. Cl.
CPC ..... *H01Q 21/0006* (2013.01); *H01Q 21/0037* (2013.01); *H04B 7/0617* (2013.01); *H04B 17/336* (2015.01); *H04L 45/74* (2013.01); *H04L 49/3009* (2013.01); *H04L 49/40* (2013.01); *H04W 40/06* (2013.01); *H04W 40/12* (2013.01); *Y02D 30/70* (2020.08)

(56) References Cited

U.S. PATENT DOCUMENTS

| | | | | |
|---|---|---|---|---|
| 6,967,347 | B2* | 11/2005 | Estes | B82Y 10/00 257/25 |
| 7,020,890 | B1* | 3/2006 | Suematsu | H04H 20/02 348/E5.127 |
| 7,072,692 | B1* | 7/2006 | Katz | H04B 7/0608 455/442 |
| 7,330,702 | B2 | 2/2008 | Chen et al. | |
| 7,626,556 | B1 | 12/2009 | Pluymers et al. | |
| 7,720,036 | B2* | 5/2010 | Sadri | H04W 16/28 370/338 |
| 8,494,084 | B1* | 7/2013 | Nabar | H04B 7/043 375/260 |
| 9,070,703 | B2* | 6/2015 | Haroun | H01L 23/66 |
| 9,386,465 | B2* | 7/2016 | Forenza | H04B 7/0626 |
| 9,699,705 | B2* | 7/2017 | Warke | H04W 40/00 |
| 2003/0053412 | A1* | 3/2003 | Yoshida | H04L 27/2647 370/208 |
| 2003/0069047 | A1* | 4/2003 | Kitahara | H04B 7/0617 455/562.1 |
| 2003/0091043 | A1* | 5/2003 | Mehrotra | H04L 45/00 370/389 |
| 2005/0053123 | A1* | 3/2005 | Higuchi | H04B 7/088 375/148 |
| 2005/0105485 | A1* | 5/2005 | Cleveland | H04B 7/0617 370/320 |
| 2005/0136841 | A1* | 6/2005 | Frank | H04B 7/0615 455/65 |
| 2006/0158382 | A1 | 7/2006 | Nagai | |
| 2006/0264210 | A1* | 11/2006 | Lovberg | H04W 92/20 455/422.1 |
| 2007/0149251 | A1* | 6/2007 | Jeon | H01Q 3/267 455/562.1 |
| 2007/0252768 | A1* | 11/2007 | Mohamadi | H01Q 3/34 343/776 |
| 2008/0075021 | A1* | 3/2008 | Rofougaran | H04B 7/0617 370/277 |
| 2008/0088501 | A1 | 4/2008 | Ohandler | |
| 2008/0112101 | A1* | 5/2008 | McElwee | H01L 27/0251 361/56 |
| 2008/0181252 | A1* | 7/2008 | Rofougaran | H04L 12/40013 370/451 |
| 2008/0254752 | A1* | 10/2008 | Oh | H04B 7/061 455/83 |
| 2008/0318524 | A1* | 12/2008 | Rofougaran | H01Q 1/2225 455/41.1 |
| 2008/0318533 | A1* | 12/2008 | Rofougaran | H04B 7/10 455/73 |
| 2008/0318606 | A1* | 12/2008 | Tsutsui | H04B 7/0417 455/500 |
| 2008/0318619 | A1* | 12/2008 | Rofougaran | G06F 13/4234 455/550.1 |
| 2009/0008753 | A1* | 1/2009 | Rofougaran | H04L 12/40013 257/660 |
| 2009/0009405 | A1* | 1/2009 | Rofougaran | G06K 7/10237 343/700 MS |
| 2009/0009408 | A1* | 1/2009 | Rofougaran | H01L 23/66 343/702 |
| 2009/0011832 | A1* | 1/2009 | Rofougaran | H04M 1/72544 463/41 |
| 2009/0015473 | A1* | 1/2009 | Tomita | H01Q 3/2605 342/367 |
| 2009/0046768 | A1* | 2/2009 | Pare, Jr. | H04B 7/0413 375/220 |
| 2009/0125746 | A1* | 5/2009 | Rofougaran | H01L 23/66 713/400 |
| 2009/0197543 | A1* | 8/2009 | Rofougaran | H04B 1/3805 455/73 |
| 2009/0237255 | A1* | 9/2009 | Rofougaran | H04L 12/40013 340/572.7 |
| 2009/0273517 | A1* | 11/2009 | Thiesen | H01Q 3/2605 342/372 |
| 2010/0009635 | A1* | 1/2010 | Qin | H01Q 3/267 455/63.4 |
| 2010/0026560 | A1* | 2/2010 | Xia | G01S 3/74 342/173 |
| 2010/0110981 | A1* | 5/2010 | Shao | H04W 76/14 370/328 |
| 2010/0124895 | A1* | 5/2010 | Martin | H01Q 1/246 455/276.1 |
| 2010/0278538 | A1* | 11/2010 | Guidotti | H04B 10/803 398/115 |
| 2011/0150066 | A1* | 6/2011 | Fujimoto | H04B 7/086 375/224 |
| 2011/0199972 | A1* | 8/2011 | Warke | H01Q 3/26 370/328 |
| 2012/0088465 | A1* | 4/2012 | Yokota | H04B 1/1036 455/278.1 |
| 2012/0196591 | A1* | 8/2012 | O'Keeffe | H01Q 1/246 455/427 |

OTHER PUBLICATIONS

Uchimura, Hiroshi, et al., "Development of a 'Laminated Waveguide'," IEEE Transactions on Microwave Theory and Techniques, vol. 46, No. 12, Dec. 1998, 6 pages.

Chang, Mau-Chung Frank, et al., "RF/Wireless Interconnect for Inter- and Intra-Chip Communications," Proceedings of the IEEE, vol. 89, No. 4, Apr. 2001, pp. 456-466.

* cited by examiner

WIRELESS CHIP-TO-CHIP SWITCHING

CROSS-REFERENCE TO RELATED APPLICATIONS

This application is a continuation of and claims priority to U.S. patent application Ser. No. 13/901,814 filed on May 24, 2013, which is a divisional of and claims priority to U.S. patent application Ser. No. 13/026,777 filed on Feb. 14, 2011, now U.S. Pat. No. 8,472,437, which claims priority to U.S. Provisional Patent Application Ser. No. 61/304,663 filed Feb. 15, 2010, which is titled "Wireless Chip-to-Chip Switching," the disclosures of which are all hereby incorporated by reference in their entireties.

TECHNICAL FIELD

Embodiments of the invention are directed, in general, to inter- and intra-chip communication using millimeter wave transmissions and, more specifically, to a router or switch using millimeter wave transmissions across a waveguide or wireless interface.

BACKGROUND

Typical on-chip and inter-chip electrical interconnections are achieved using copper wires. Several problems result from the physical characteristics of electrical interconnections, including, for example, propagation delay, bandwidth limitations, and power requirements. Resistance and capacitance variations in the electrical interconnection wires create design concerns, such as circuit matching, mutual interference, and crosstalk issues. Electrical interconnections are also limited in their capability to provide point-to-multipoint connections. Optical interconnections have been suggested for use in place of some electrical interconnections to increase bandwidth, reduce parasitic resistance and capacitance, and minimize crosstalk, for example. However, optical interconnections add to manufacturing costs and increases design complexity.

The existing Cisco Catalyst 6500 Crossbar Switching Fabric, such as employed in the Cisco Catalyst 6509 and 6513, is an example of the current art. Eighteen individual fabric channels are apportioned across line card slots in a chassis. This arrangement provides a maximum of two fabric channel connections per line card. Each fabric channel is currently clocked up to 50 Gbps (i.e. 8×6.25 Gbps) full duplex. The maximum data rate out of the line card is 100 Gbps, and the data rate into the line card is 100 Gbps. The total dedicated rate provided is 18×50=900 Gbps. For full duplex operation, this equates to 900 Gpbs×2=1.8 Tbps.

Next generation switching requirements are expected to increase and will be around 3.6 Tbps, or so, with shared bus switching requirements around 1.8 Tbps. For a 50 Gbps link between two line cards, two 50 Gbps links into the switch fabric card are required. Data packets exchanged between the line cards must be routed through a switch Application Specific Integrated Circuit (ASIC). The switch ASIC contains a routing table for routing the data packets between the transmitting and receiving line cards. The use of a switch ASIC requires two links to route packets from the transmitting line card to the receiving line card—one link from the transmitting card to the switch ASIC and a second link from the switch ASIC to the receiving line card. As a result, compared to a direct connection between line cards, twice the power is required and twice the delay is added. The use of a switch ASIC requires increased complexity and additional routing. Combined with the electrical interconnection limitations, it will be difficult to provide the expected future switching requirements.

SUMMARY

Embodiments of the invention are directed, in general, to chip-to-chip communications in electrical circuits. Embodiments of the invention further address the problem of high speed (e.g. multi-Gbps) data switching between chips in a confined environment, such as a switch/router or blade server, by replacing the switch Application Specific Integrated Circuit (ASIC) with wireless chip-to-chip communications.

One embodiment of the invention uses wireless communication between chips in place of—or in addition to—the wired serializer/deserializer (SerDes) connections that are typically used to transmit data between chips. Exemplary embodiments include: (1) beamforming an RF signal for direct wireless transmission through the air between chips, components, or boards and; (2) using waveguides connecting various chips to carry radio frequency (RF) signals between chips, components, or boards. The waveguides could be either embedded in the PCB/package or external waveguides. Current solutions are based on point-to-point wired SerDes connections between chips. As a result, a direct multipoint electrical link is not generally feasible. The use of wireless communications either through a waveguide or directly through air would allow for point-to-multipoint transmission among a plurality of chips.

Existing point to multi-point links in switches/routers generally require a switch ASIC that is responsible for switching the incoming data to the correct output port. This is expensive in terms of cost and power. The invention avoids the use of such a switch fabric and the associated costs. Further, as the required switching rate increases, the complexity of current board switching approaches and number of layers in the backplane design increases as well. The invention involves less increase in backplane complexity.

BRIEF DESCRIPTION OF THE DRAWINGS

Having thus described the invention in general terms, reference will now be made to the accompanying drawings, wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Two exemplary implementations for addressing next generation switching requirements are (1) waveguide communication based on millimeter wave (mmWave) transmission between line cards, and (2) wireless chip-to-chip communication based on mmWave transmission. In another embodiment, a hybrid approach uses a combination of mmWave transmission for long reach connections and very low-power electrical SerDes for short reach connections.

For example, in one embodiment, a 60 GHz CMOS-based transceiver having an RF carrier at 60 GHz and a 2 GHz bandwidth provides 200 mW/lane at 10 Gbps. Waveguide and in-box wireless channels would be relatively static, and would give a spectral efficiency of 5 bps/Hz data rate or 5 bps/Hz×2 GHz=10 Gbps data rate. Multiple transceivers, each operating at a distinct carrier frequency in non-overlapping bands, can be bonded together to generate a transmitter/receiver (Tx/Rx) that operates at a multiple of 10 Gbps. Although the power per transceiver may be comparable to existing switched-ASIC systems, power and cost savings at the system level will be achieved by using direct line card-to-line card communication with a shared-bus architecture that eliminates of one-half of the lanes and the switch fabric card of the existing switched-ASIC systems.

Example implementations using waveguide-based mm-wave transmission are described with reference to FIGS. 1 and 2.

Waveguides, such as commercially available aluminum air-filled waveguides, have typical bandwidths of 15-20 GHz, and losses of 1 dB/ft. Technology exists for embedded waveguides in PCB FR4 material. A maximum data rate for each waveguide can be estimated as 10×10 Gbps=100 Gbps. This estimate assumes a bandwidth of 20 GHz, which allows for 20 GHz/2 GHz=10 independent sub-channels, where the carrier frequencies for the independent sub-channels are separated by 2 GHz and each sub-channel operates at 10 Gbps. With two waveguides per line card transmitter, a data rate of 200 Gbps out of each line card can be achieved to meet the estimated next-generation switching requirements.

Figure 1:
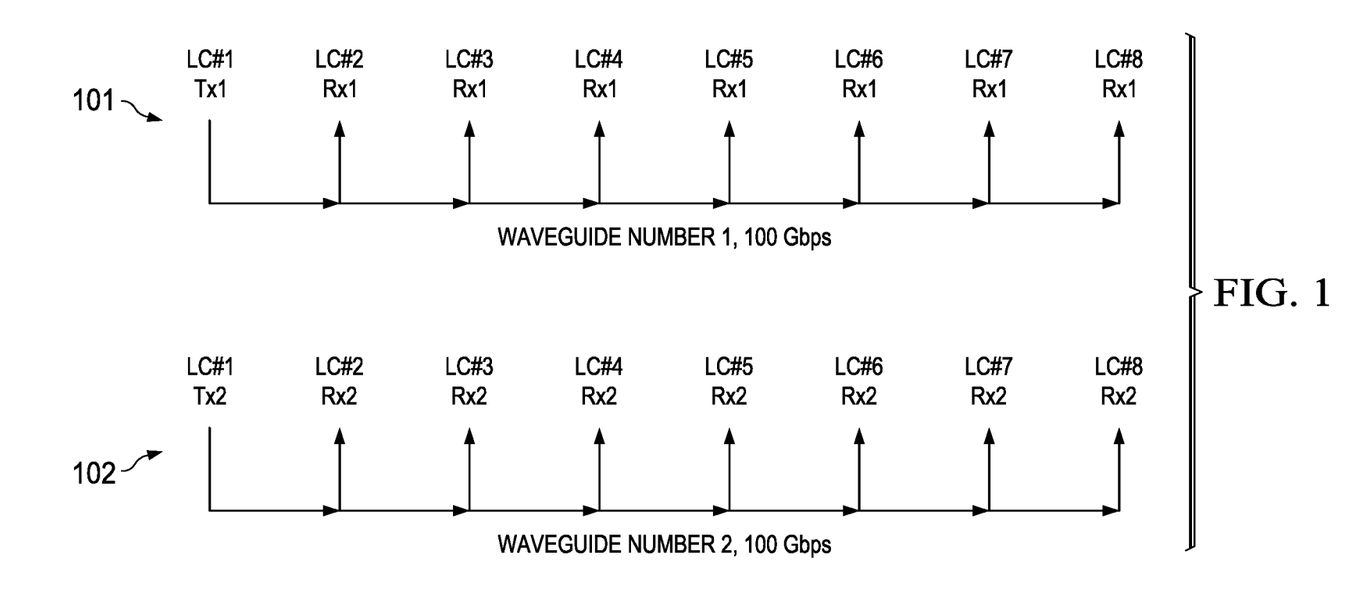
FIG. 1 illustrates waveguide-based millimeter (mm)-wave transmission for chip to multi-chip communications.

FIG. 1 illustrates two waveguides 101 and 102 that are each coupled to eight line cards LC #1-8. Line card LC #1 transmits on both waveguides 101, 102, and line cards LC #2-8 receive signals LC #1 on both waveguides. For eight line cards, a total of sixteen waveguides may be utilized. Each line card LC #1-8 would have two transmitters (Tx) allowing for 200 Gbps out of each line card.

This type of configuration provides for at least two options for the receivers on each line card. In one embodiment, each line card LC #1-8 has two receivers (Rx), which would allow 200 Gbps total into each line card. The receivers on each line card may be shared among all of the waveguides from the other line cards. Synchronization is used among the various transmitters on each line card at a cost of some additional power. The total I/O power for the system would be 200 mW/lane×10 lanes/waveguide×16 waveguides=32 W. In an alternative embodiment, each line card has fourteen receivers so that there are two receivers on each line card for each of the seven other line cards, which would provide 1.4 Tbps into each line card. The receivers on each line card are dedicated to a specific waveguide in this implementation, so synchronization is not required. The total I/O power is 400 mW/(1 Tx+7 Rx) lane×10 lanes/waveguide×16 waveguides=64 W. With synchronization, however, the receiver channels (Rx) can be turned off to reduce power consumption when not in use.

Figure 2:
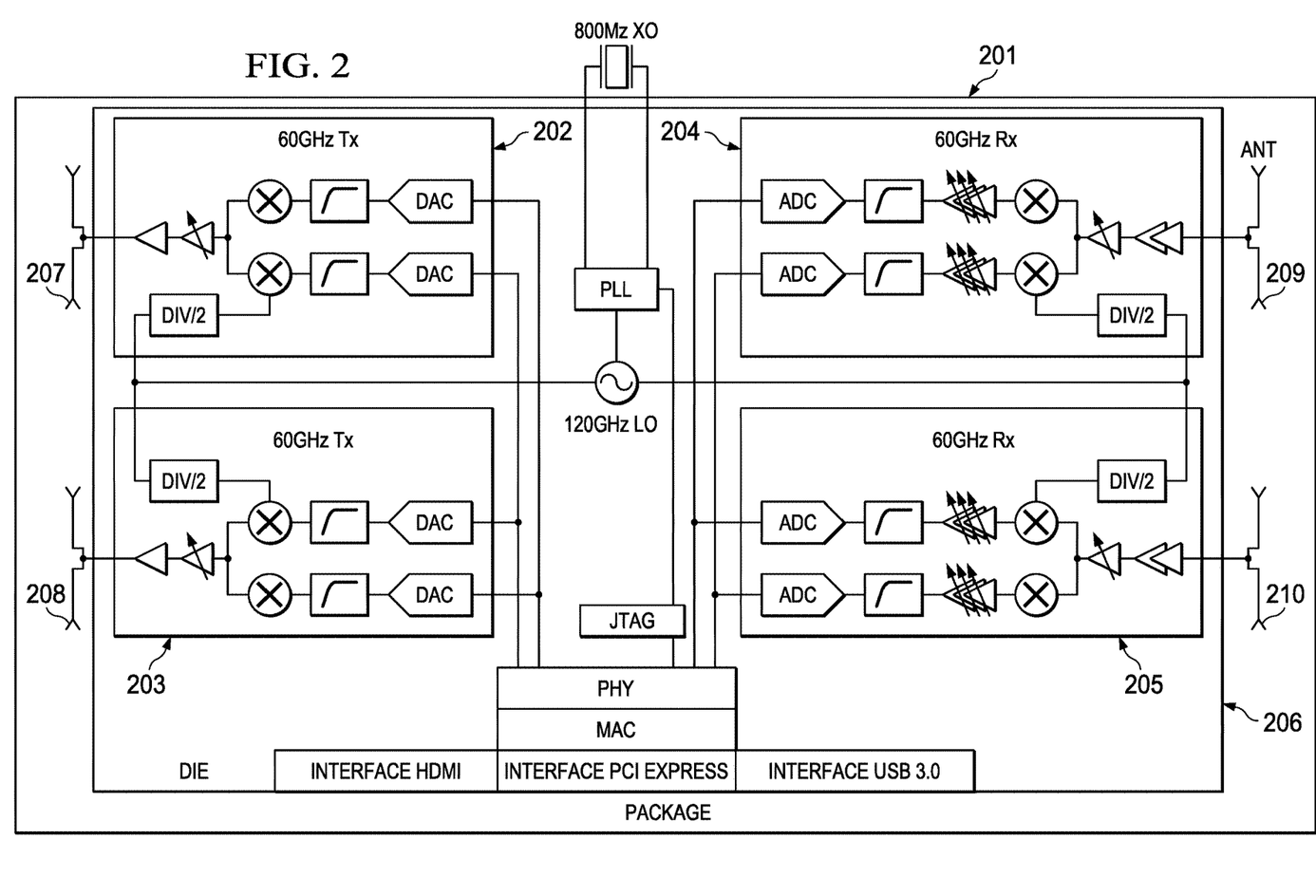
FIG. 2 is a block diagram illustrative of a typical RF mmWave transceiver with multiple antenna.

FIG. 2 is a block diagram illustrating an example RF mmWave transceiver 201 for wireless and waveguide based mm-wave transmission implementations according to one embodiment. Transmitters 202 and 203 and receivers 204 and 205 are constructed on die 206. Transmitters 202 and 203 radiate RF signals using antennas 207 and 208, and receivers 204 and 205 receive RF signals using antennas 209 and 210. In one embodiment, the RF signals may be applied to waveguides, such as waveguides 101 and 102 (FIG. 1). For example, package 201 may be on line card #1, and transmitter 202 transmits via waveguide 101 while transmitter 203 transmits via waveguide 102. Alternatively, package 201 may be on one of line cards #2-8, and receiver 204 receives signals from a port on waveguide 101, while receiver 205 receives signals from a port on waveguide 102. Alternatively, transmitters 202 and 203 and receivers 204 and 205 may communicate with other devices across a free space air interface instead of using waveguides.

Figure 3A:
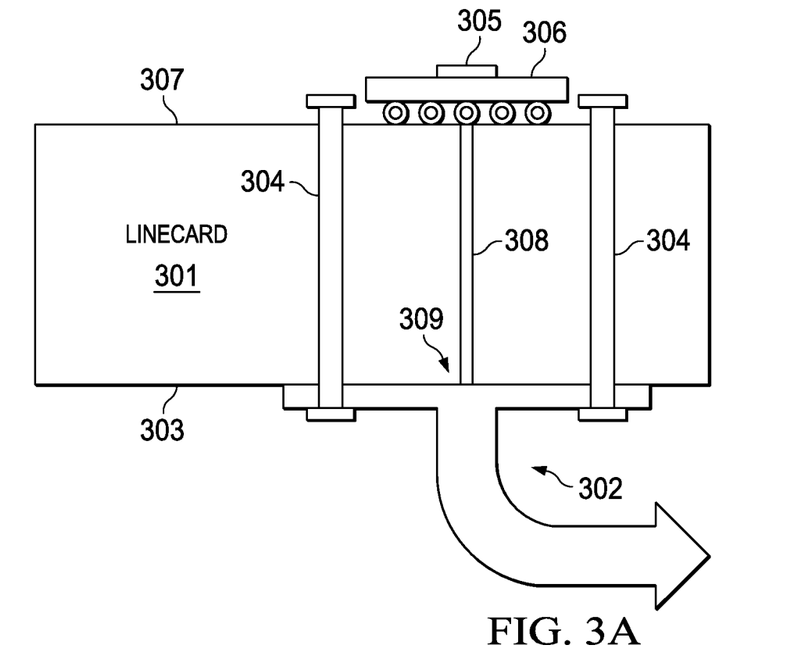
FIG. 3A is a block diagram illustrative of example waveguide transition for waveguide based mm-wave transmission for line cards.
Figure 3B:
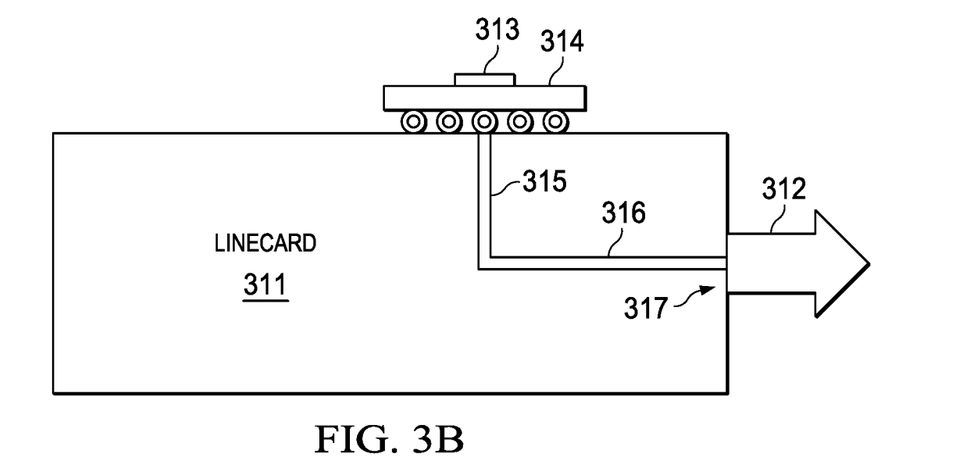
FIG. 3B is a block diagram illustrative of another example waveguide transition for waveguide based mm-wave transmission for line cards.

FIGS. 3A and 3B illustrate examples of die/package to waveguide transitions usable for waveguide-based mm-wave transmission implementations. Referring to FIG. 3A, PCB line card 301 is coupled to waveguide 302, which is attached to surface 303 of line card 301 using fasteners 304. Die 305 and package 306 are mounted on surface 307 of line card 301. Surface 307 is on the opposite side of line card 301 from surface 303. Via 308 through line card 301 provides a connection between package 306 and waveguide 302 at via to waveguide transition 309.

FIG. 3B illustrates an alternative embodiment in which PCB line card 311 is coupled to waveguide 312. Line card 311 may be adapted to couple with a back plane PCB (not shown). Waveguide 312 may be embedded in the backplane PCB with access at locations on the top surface of the backplane PCB corresponding to the positions of line card 311 and other line cards. Die 313 and package 314 are mounted on line card 311. Via 315 in line card 311 is coupled to strip line 316, which is in turn coupled to waveguide 312 at transition 317.

One embodiment of a system for routing mmWave signals out of a package and to a waveguide comprises using a stripline to waveguide transition that consists of a patch antenna and impedance transformer as disclosed in C. Buoli et al, "A broadband microstrip to waveguide transition for FR4 multilayer PCBs up to 50 GHz", 32th European Microwave Conf., September 2002, the disclosure of which is hereby incorporated by reference herein in its entirety.

Example implementations of wireless chip-to-chip mm-wave transmission use a frequency spectrum of 40 GHz-80 GHz with 2 GHz sub-channels. This arrangement would allow for 20 sub-channels (i.e. =40 GHz band/2 GHz band/channel) that would be available to the transceivers. The maximum data rate supported by this arrangement would be 20×10 Gbps=200 Gbps/channel.

Space division multiplexing may be used to support multiple channels. Beamforming may be used to communicate between a transmitter on a first chip or line card and a receiver on a second line card or chip. The beamwidth for a 60 GHz signal can be made very narrow—on the order of 5 degree half-power beamwidth (HPBW)—to avoid interference. Interference is possible between various multiplexed beams due to "near field" environment in the equipment rack or box. The effects of such interference can be studied through electromagnetic simulations. "Windows" may be needed in the line cards' PCB—i.e., sections of the PCB in which the metal has been cleared or removed metal—to allow for "line-of-sight" transmissions between transmitters and receivers on different chips or line cards. Interference may be minimized by coating surfaces with mm-wave absorbent material to prevent reflections.

A single transmitter and receiver—each with twenty transceivers integrated and each capable of transmitting and receiving 200 Gbps simultaneously—may be provided on each line card. Using two transmitters and two receivers per line card, with one on each side, and keeping the same total number of integrated transceivers between the two will give better performance. The use of synchronization is preferred.

For an example embodiment having eight line cards, a total power of: 200 mW/lane×20 lanes/line card×8 line cards=32 W may be used. Such an implementation of wireless, chip-to-chip mmWave transmission would eliminate the requirement for a centralized switch fabric, thereby providing significant power savings.

Figure 4:
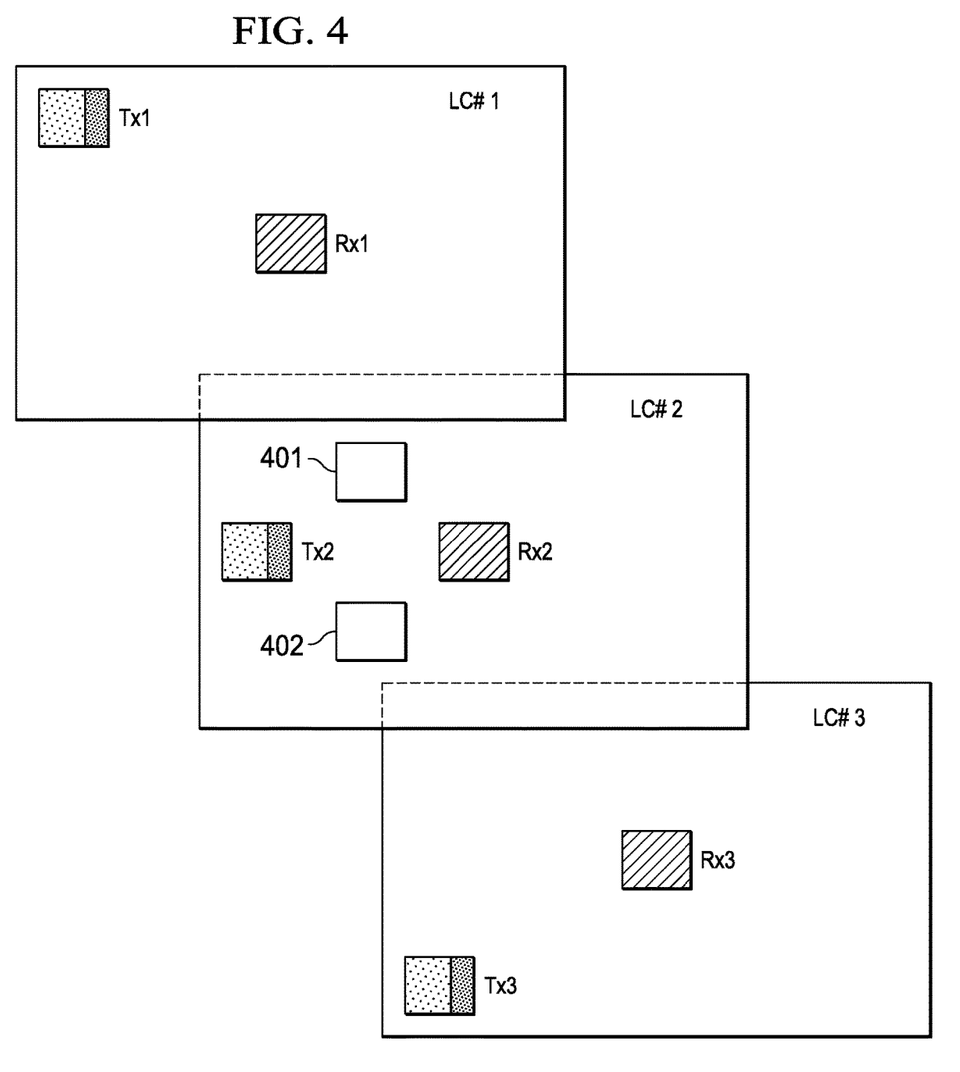
FIG. 4 illustrates an example configuration for wireless chip-to-chip mmWave transmission across multiple line cards.

FIG. 4 illustrates an example configuration for wireless chip-to-chip mmWave transmission across multiple line cards LC #1-3, which are stacked one above the other vertically, or arranged side-by-side horizontally. Each line card includes a transmitter Tx1-3 and a receiver Rx 1-3. Instead of—or in addition to—using electrical or optical interconnections between line cards LC #1-3, the line cards communicate with each other using RF mmWave transmissions. The transmitters Tx1-3 are spatially skewed to provide different angles of arrival at each line card. For example, Tx1 on line card LC #1 transmits to Rx2 on line card LC #2 at one angle and transmits to Rx3 on line card LC #3 at a different angle. Similarly, Tx2 on line card LC #2 and Tx3 on line card LC #3 transmit to each other line card at different angles. In order for the mmWave transmission from Tx1 to pass through line card LC #2 to Rx3, window 401 is created in LC #2. Window 402 is an area on line card LC #2 in which the metal has been removed so that the area is essentially transparent to RF signals. Without creating window 401, the signal from Tx1 would be blocked, reflected and/or attenuated by the metal in LC #2 before reaching Rx3. Similarly, window 402 is provided in LC #2 to allow signals from Tx3 to pass through to Rx1.

An alternative implementation uses a hybrid approach in a combination of low-power electrical SerDes communication for short reach connections and mm-wave communications for long reach connections.

Table 1 is a comparison of both waveguide and wireless mmWave embodiments to a typical current solution. The current solution assumes one switch fabric card per chassis, which is estimated to take 350 W.

TABLE 1

|  | CURRENT SYSTEM | WAVEGUIDE MM-WAVE | WIRELESS MM-WAVE |
| --- | --- | --- | --- |
| Performance | 100 G full duplex/line card | 200 G full duplex/line card | 200 G full duplex/line card |
| Min. Power | 51 W IO + switch fabric power | 32 W IO (no switch fabric) | 32 W IO (no switch fabric) |
| Complexity | 30 layer backplane + expensive connector | <15 layer board with expensive connector | <15 layer board with cheap connector |

Those skilled in the art to which the invention relates will appreciate that modifications to the described embodiments and additional embodiments are possible within the scope of the disclosed invention. For example, in other embodiments, it would be possible to eliminate line cards and to build waveguides and transmitter and receiver devices directly on the back plane. Alternatively, power and costs associated with the line cards may be reduced by applying the wireless or waveguide mmWave transmission techniques between port ASICs and the fabric ASIC.

Figure 5:
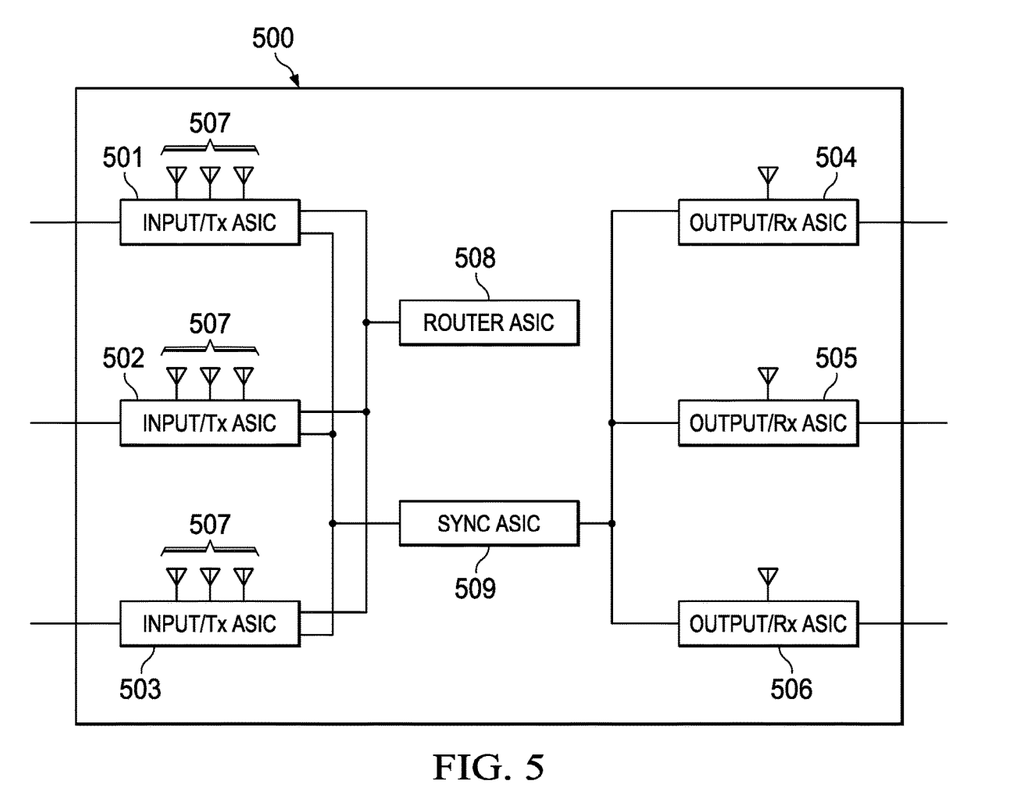
FIG. 5 illustrates an exemplary embodiment of a router using mmWave communication between input and output ports.

FIG. 5 illustrates an exemplary embodiment of a router 500 using mmWave wireless communication between input and output ports. Data packets are received by router 500 at port ASICs 501-503 and are output at port ASICs 504-506. Input port ASICs 501-503 act as transmitters, and output port ASICs 504-506 act as receivers. Each of the input port ASIC transmitters 501-503 has one or more antennas 507. Received packets at input port ASICs 501-503 are transmitted using mmWave RF signals to output port ASICs 504-506. The input port ASICs 501-503 may transmit the data packets either in a broadcast mode signal that covers all of the output port ASIC receivers 504-506 or in a beamswitching mode signal that is directed at a specific one of the output port ASIC receivers 504-506. Although the term "router" is used to describe the embodiment illustrated in FIG. 5, it will be understood by those of ordinary skill in the art that the technology described herein would also apply to devices that operate as a switch, hub, gateway, bridge or similar device.

Figure 6:
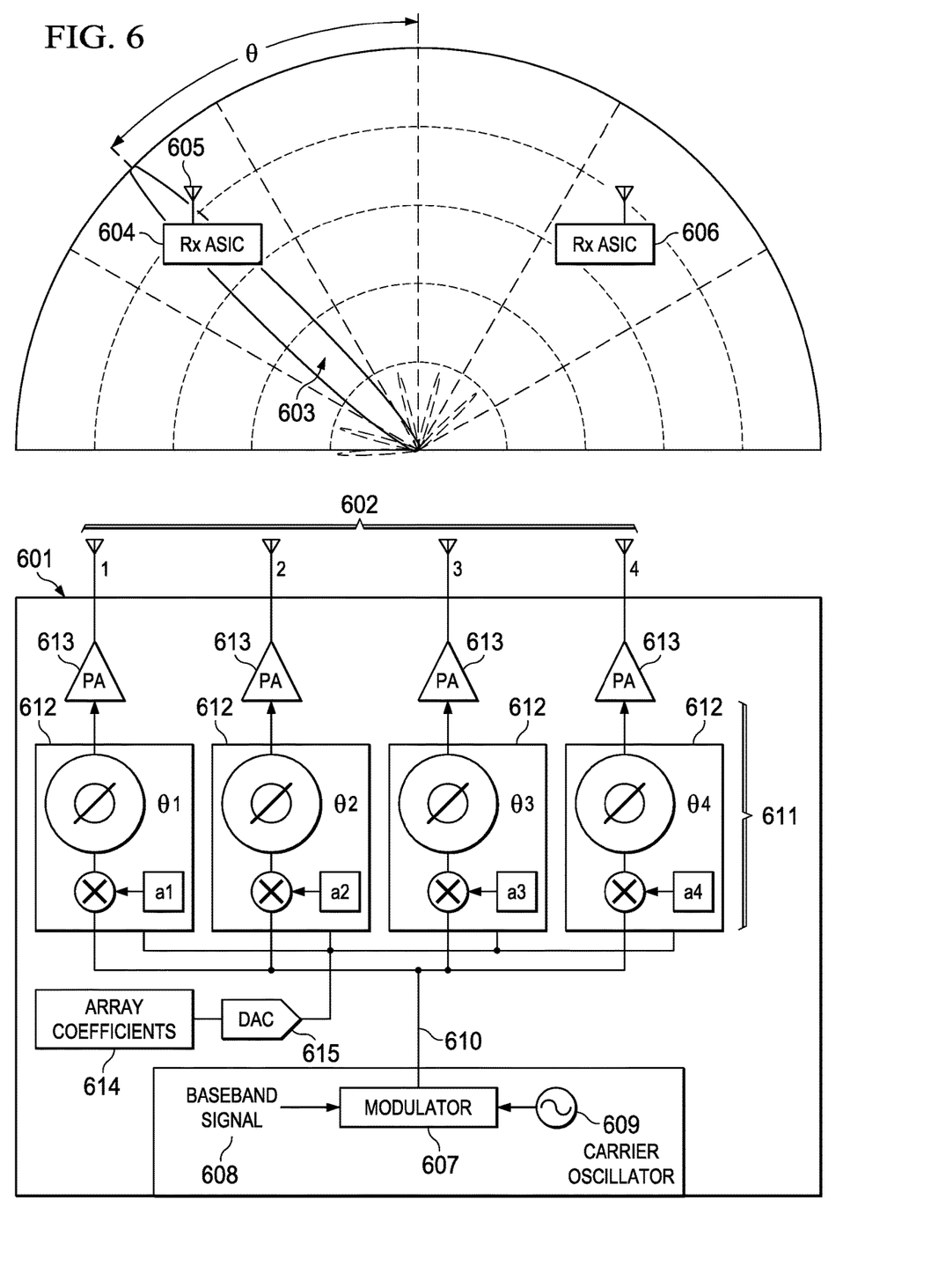
FIG. 6 illustrates beamsteering by transmitter ASIC having a beamforming antenna array.

FIG. 6 illustrates beamsteering by transmitter ASIC 601 having a beamforming antenna array 602. In one embodiment, antenna array 602 comprises dipole antennas having a length corresponding to half the wavelength of the RF signals. The magnitude and phase of the signal transmitted by each antenna in array 602 is selected to form beam 603. The antenna beam 603 may be swept by a variable angle Θ. Beamsteering combines RF signals from non-directional antennas to constructively combine RF energy in a particular direction while significantly reducing it in all other directions. The radiation pattern from the combined RF energy from the antenna elements in array 602 can be pointed electronically in any arbitrary direction without physically moving the antenna array. Using the beamforming antenna array 602, transmitter ASIC 601 can target antenna 605 of receiver ASIC 604 to receive the transmitted data packets, while not covering receiver ASIC 606. Transmitter ASIC 601 includes modulation circuit 607 that modulates baseband signal 608 by carrier signal 609. Baseband signal 608 includes the information carried on the data packets to be routed. The radio signal output 610 from modulator 607 is then routed to beamformer circuitry 611, which provides an adjustment 612 for each antenna in array 602. The output of beamformer 611 is amplified in power amplifiers 613 before being radiated in antennas 602. Transmitter ASIC 601 selects the appropriate amplitude a1-a4 and phase φ1-φ4 adjustment 612 to control the angle Θ of the transmitted beam. Array coefficient register 614 stores values for each receiver ASIC 604, 606. Digital-to-analog converter (DAC) 615 converts the stored array values in register 614 to analog values used in the beamformer circuitry 611.

Figure 7:
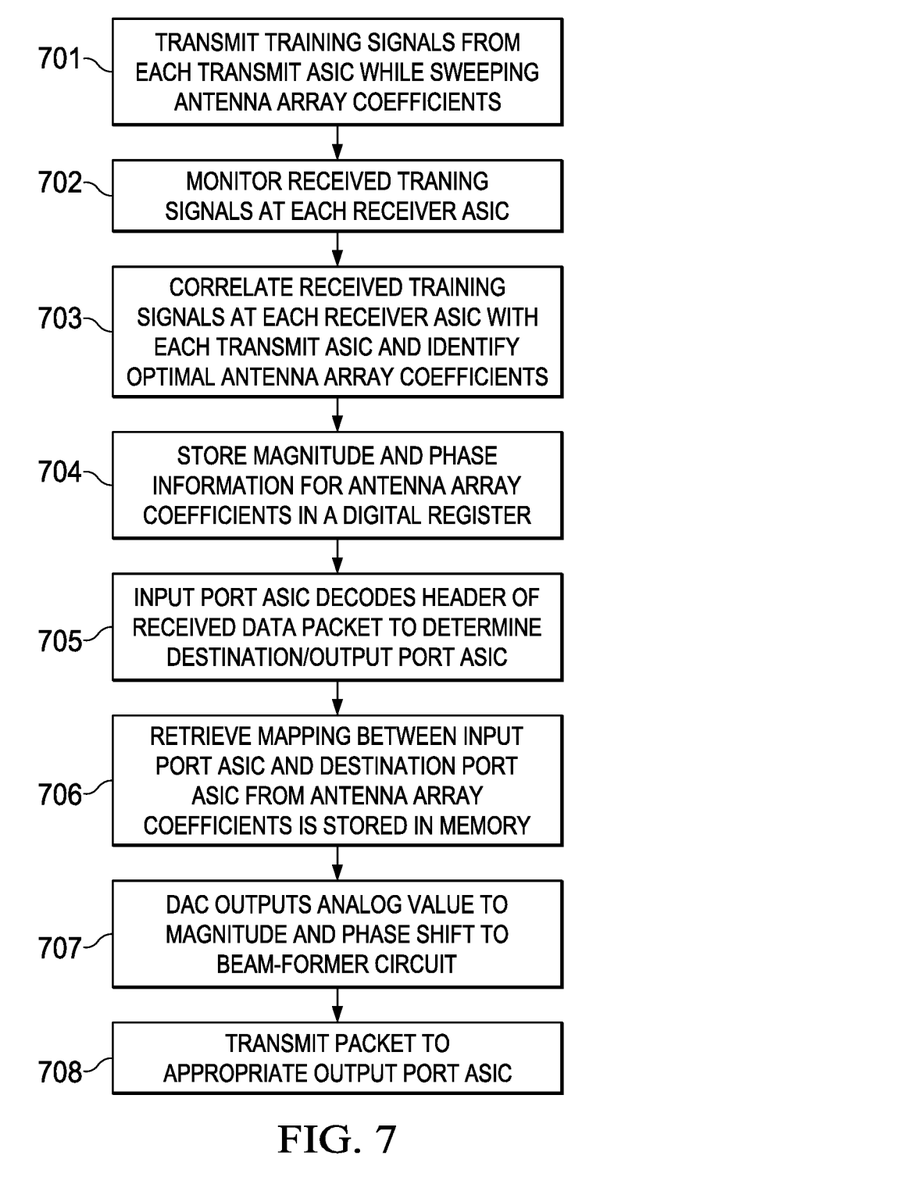
FIG. 7 illustrates a procedure for controlling port ASIC to port ASIC communications using dynamic beam-switching among spatially located ASICs.

FIG. 7 illustrates a procedure for controlling port ASIC to port ASIC communications using dynamic beamswitching among spatially located ASICs. In step 701, the antenna array coefficients for transmitter ASICs are swept while a training signal is transmitted. In step 702, the receiver ASICs monitor received training signals. In steps 701 and 702, the transmitter ASICs may transmit sequentially or simultaneously and the receiver ASICs may monitor the received signals sequentially or simultaneously. In step 703, the received training signals at each receiver ASIC are correlated and the optimal antenna array coefficients for each transmitter ASIC are identified. In step 704, the antenna array coefficients, which include magnitude and phase information for each antenna element, are stored in a digital register or memory. The antenna array coefficients map each transmitter ASIC to the receiver ASICs.

During operation of the router or switch, data packets are received by input/transmitter port ASICs. In step 705, the input port ASIC decodes the header of the received data packets and determines the destination or output port ASIC. In one embodiment, each input port ASIC contains a full routing table that the ASIC uses to identify the destination or port ASIC. In another embodiment, a central router ASIC, such as ASIC 508 (FIG. 5), stores the routing table. The central router ASIC is used by each input port ASIC to identify the destination ASIC. For example, an input port ASIC extracts the header information from a received data packet and sends header information to the central router ASIC. The central router ASIC maps the destination IP address from the header information to an associated output port ASIC. The identity of the output ASIC is returned to the input port ASIC.

In step 706, using the mapping between input port ASIC and destination port ASIC, the input port ASIC retrieves the appropriate antenna array coefficients from memory. In step 707, a DAC converts the antenna array coefficients to analog magnitude and phase shift values for use by the beamforming circuitry in the input port ASIC. The input port ASIC then transmits the data packet to the destination port ASIC using the targeted antenna beam in step 708. After the current data packet is transmitted, the next data packet is received and the antenna array is adjusted to the appropriate destination ASIC for the next data packet using steps 705-708.

In one embodiment, the input and output port ASICs (501-506, FIG. 5) receive synchronization from received data packets. In another embodiment, a synchronization (sync) pattern is routed to all of the port ASICs to keep them synchronized. For example, sync ASIC 509 (FIG. 5) may provide a sync pattern to the input and output port ASICs (501-506). The sync pattern may be broadcast in an RF signal from synch ASIC 509, or sent to each port ASIC via an electrical interconnection. Similarly, router ASIC 508 may communicate with the input port ASICs 501-503 using either RF signals or electrical interconnections.

In another embodiment, the mmWave transmissions between the input port ASICs and output port ASICs may use Frequency Division Multiplexing (FDM) with multiple carriers to increase overall system capacity.

As discussed above, in other embodiments, mmWave transmissions between devices or line cards may be carried on a multi-tap waveguide. The waveguide structure confines the propagation of the electromagnetic wave and guides the mmWave transmissions between devices or line cards. The dimensions of the waveguide are proportional to the mmWave transmission wavelength. The height and width of the waveguide would be reduced as the carrier frequency of the mmWave is increased. Splitters may be formed along the waveguide to tap off energy to multiple receivers. The splitters may be designed to tap off approximately equal energy into each of the receivers so that the power of the transmitted mmWave is distributed equally to each receiver. The waveguides may be external to the device or line card or may be embedded in the line card PCB.

Figure 8:
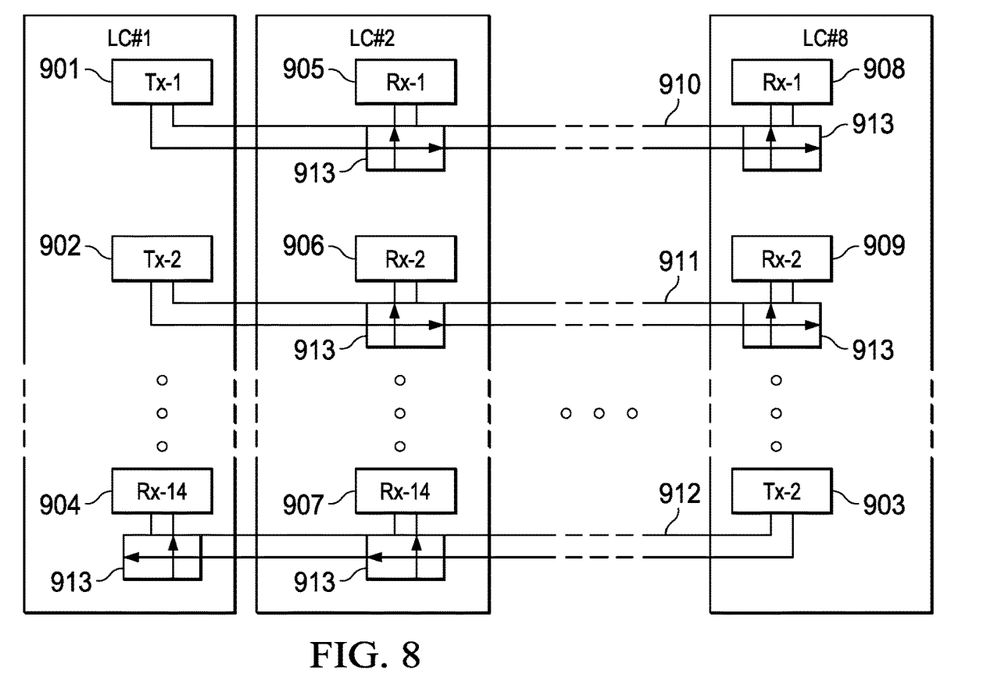
FIG. 8 illustrates another embodiment of an eight line card system connected using shared mmWave waveguides in which each line card includes two transmitters and fourteen receivers.

FIG. 8 illustrates another embodiment of an eight line card system in which each line card LC #1-8 includes two transmitters 801-803 and fourteen receivers 804-809. Each transmitter 801-803 is associated with a waveguide 810-812. In one embodiment, each of line cards LC #1-8 are connected to a backplane (not shown). Waveguides 910-912 may be external to the line cards LC #1-8 and the backplane, or the waveguides 910-912 may be fully or partially embedded in either the line cards LC #1-8 and/or the backplane.

Each transmitter 801-803 transmits mmWave signals to the other line cards across its respective waveguide 810-812. The line cards LC #1-8 may treat one of the two transmitters and corresponding transmission waveguides as a redundant or backup transmission medium, or both transmitters on a line card may transmit different information on each waveguide, thereby effectively doubling the transmission capability of the line cards compared to a single waveguide system. Each receiver 804-809 is coupled to a waveguide 810-812 using a directional coupler or splitter 813. In one embodiment, each directional coupler 913 is designed so that approximately equal amounts of energy are extracted at each line card.

The system illustrated in FIG. 8 may also be used, for example, to provide direct port ASIC to port ASIC communication in a switch or router using a multi-tap waveguide. Instead of representing line cards, LC #1-8 may represent port ASICs in a router. LC #1, for example, may be an input port ASIC that receives data packets and determines which output port ASIC (LC #2-8) should receive the data packet.

To route data packets, the input port ASIC LC #1 receives the next packet and decodes the header to determine the destination port ASIC (LC #2-8). Each port ASIC LC #1-8 may contain a routing table that is updated periodically. In an alternative embodiment, the data packet header is transmitted to a routing ASIC that serves all the port ASICs and that passes back destination information based upon the header. The port ASIC LC #1, for example, only needs to send the header information to the routing ASIC, which maps the destination IP address to an output port ASIC. The identity of the output port ASIC is sent back to the input port ASIC, which then routes the entire data packet to the destination ASIC.

To transmit the data packet to the destination ASIC, the input port ASIC may encapsulates the data packet into a larger packet that includes local header information that contains the destination port ASICs receive address. The port ASIC receive addresses may be predetermined so that the transmitting port ASIC knows how to address the data packet.

Figure 9:
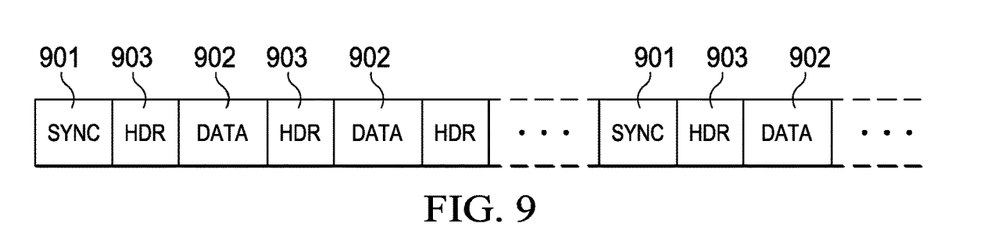
FIG. 9 illustrates one embodiment of a protocol for sending data packets from one port ASIC to another in a chip to multi-chip communication scenario.

FIG. 9 illustrates one embodiment of a protocol for sending data packets from one port ASIC to another. A periodic sync field 901 is broadcast across the waveguide and is used by all of the receiving ASICs for timing training and carrier compensation. Each data packet is placed in a data field 902, which is preceded by a local header 903. The local header 903 contains the receiver address for the destination port ASIC. Each port ASIC has a unique address. Common addresses may also be used for preselected groups of receivers such as when data is broadcast to more than one destination port ASIC.

The data packets are transmitted by a common waveguide, such as waveguides 910-912, to all of the other port ASICs. Each of the receivers on the destination port ASICs decodes the local header field 902. Only the addressed or desired port ASICs decode the data in the full packet 902. The local header 903 is discarded by the receiving port ASIC.

In addition to using a waveguide to transmit data packets using mmWave communications between line cards or ASICs, the same techniques may also be used to support intra-chip communications in a multi-chip module (MCM).

Figure 10:
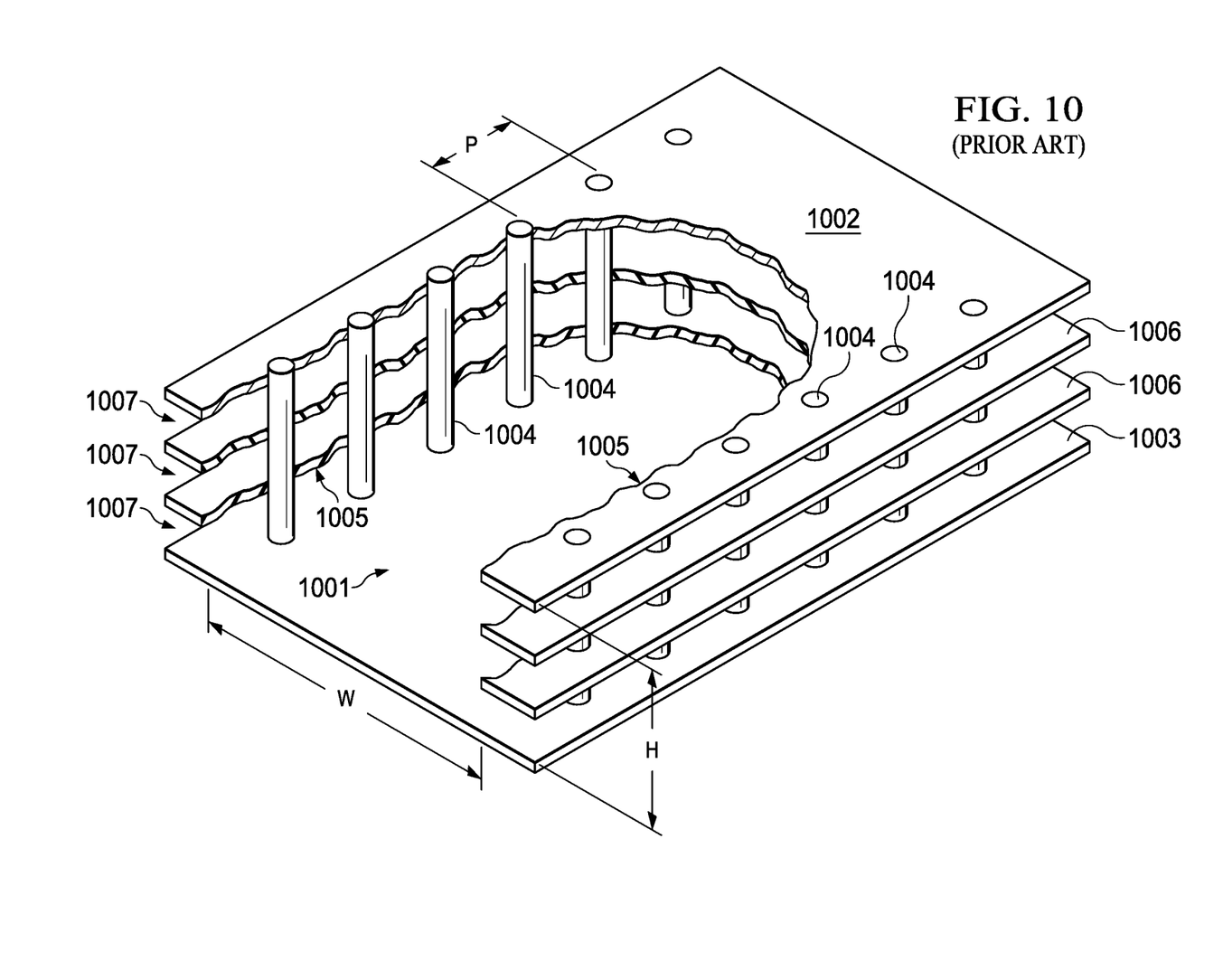
FIG. 10 illustrates a laminated waveguide construction according to one embodiment.

FIG. 10 illustrates a laminated waveguide construction according to one embodiment. Waveguide 1001 is formed by top (1002) and bottom (1003) conductive layers. The side walls of waveguide 1001 are formed by lined vias 1004 and the edge 1005 of other conductive layers 1006. Dielectric 1007 fills the area between conductive layers 1002, 1003, 1006. In one embodiment, the width w of waveguide 1001 is approximately one wavelength of the mmWave signal. The height h of waveguide 1001 is approximately half of the width w or half of one wavelength. The distance or pitch p between vias 1004 is approximately one quarter wavelength of the mmWave.

One embodiment of a laminated waveguide construction is disclosed in Uchimura et al., "Development of a Laminated Waveguide", IEEE Trans Microwave Theory and Techniques, December 1998, the disclosure of which is hereby incorporated by reference herein in its entirety.

Figure 11:
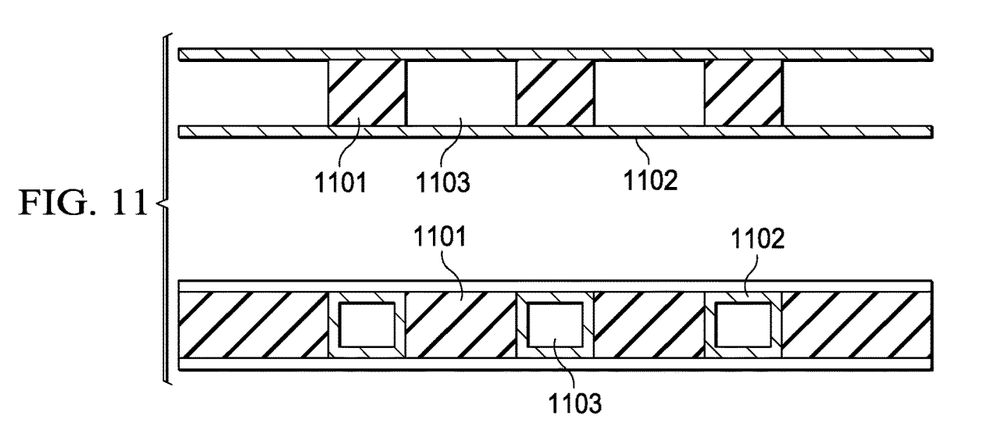
FIG. 11 illustrates alternative embodiments of embedded waveguide structures.

FIG. 11 illustrates alternative embodiments of embedded waveguide structures. Dielectric areas 1101 and metal areas 1102 may be combined in different configurations to create waveguides 1103.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A first networking device, comprising:
    an input port circuit having a transmitter circuit coupled to a transmitter antenna array, wherein the input port circuit transmits data using millimeter wave signals;
    output port circuits, each of the output port circuits having a receiver circuit coupled to one or more receiver antennas; and
    a beamforming circuit coupled to the transmitter antenna array of the input port circuit, wherein the beamforming circuit is configured to:
        cause the transmitter antenna array to transmit a first antenna beam that includes a training signal to a second networking device that includes a second receiver circuit, wherein a first set of transmitter antenna array coefficients are swept during the transmitting of the training signal such that the first antenna beam is swept by a variable angle;
        determine, based on the training signal, an optimal set of transmitter antenna array coefficients associated with beamforming to target the second networking device; and
        cause the transmitter antenna array to transmit a targeted antenna beam that includes the data to the second networking device using the optimal set of transmitter antenna array coefficients associated with beamforming to target the second networking device.

2. The first networking device of claim 1, wherein:
    the beamforming circuit includes a set of adjustment circuits;
    the transmitter antenna array includes a set of antennas each coupled to a respective adjustment circuit of the set of adjustment circuits; and
    the optimal set of transmitter antenna array coefficients includes a respective amplitude adjustment for each adjustment circuit of the set of adjustment circuits.

3. The first networking device of claim 2, wherein the optimal set of transmitter antenna array coefficients includes a respective phase adjustment for each adjustment circuit of the set of adjustment circuits.

4. The first networking device of claim 2, wherein the transmitter circuit includes a set of power amplifiers, each coupled between a respective adjustment circuit of the set of adjustment circuits and a respective antenna of the set of antennas.

5. The first networking device of claim 1 further comprising a modulation circuit coupled to the beamforming circuit and configured to:
    receive a baseband signal that includes the data;
    receive a carrier signal; and
    modulate the baseband signal by the carrier signal to produce an output signal, wherein the beamforming circuit causing the targeted antenna beam to be transmitted includes the beamforming circuit applying the optimal set of transmitter antenna array coefficients to the output signal.

6. The first networking device of claim 1, wherein the transmitter antenna array includes a set of dipole antennas.

7. The first networking device of claim 1, wherein the beamforming circuit is configured to determine, based on the training signal, a respective set of transmitter antenna array coefficients for each of a plurality of networking devices that includes the second networking device.

8. The first networking device of claim 1 further comprising a memory configured to store the optimal set of transmitter antenna array coefficients associated with beamforming to target the second networking device.

9. The first networking device of claim 8 further comprising a digital to analog converter coupled between the memory and the beamforming circuit.

10. The first networking device of claim 1, wherein the data is transmitted in the targeted antenna beam using frequency division multiplexing.

11. The first networking device of claim 1, wherein the first networking device comprises a router, a switch, a hub, a gateway, a bridge, or a combination thereof.

12. A method for transmitting a data packet, comprising:
    transmitting, by a transmitter circuit, a training signal in a first transmission beam by a transmitter antenna array such that the first transmission beam is swept by a variable angle by sweeping a first set of transmitter antenna array coefficients;
    determining, based on the training signal, an optimal set of transmitter antenna array coefficients associated with beamforming to target a destination receiver circuit;
    identifying, by the transmitter circuit, the destination receiver circuit as corresponding to a destination address in the data packet;

retrieving, from stored sets of antenna array coefficients at the transmitter circuit, the optimal set of transmitter antenna array coefficients associated with beamforming to target the destination receiver circuit; and transmitting, using the transmitter antenna array, the data packet as a radio frequency (RF) signal over a wireless interface by using the optimal set of transmitter antenna array coefficients to create a second transmission beam targeting the destination receiver circuit.

13. The method of claim 12, wherein:

the transmitter circuit includes a set of adjustment circuits;

the transmitter antenna array includes a set of antennas, each coupled to a respective adjustment circuit of the set of adjustment circuits; and the transmitting of the data packet includes, for each of the set of antennas, applying a respective gain adjustment according to the optimal set of transmitter antenna array coefficients using the respective adjustment circuit of the set of adjustment circuits.

14. The method of claim 13, wherein the transmitting of the data packet includes, for each of the set of antennas, applying a respective phase adjustment according to the optimal set of transmitter antenna array coefficients using the respective adjustment circuit of the set of adjustment circuits.

15. The method of claim 13, wherein the transmitter circuit includes a set of power amplifiers, each coupled between a respective adjustment circuit of the set of adjustment circuits and a respective antenna of the set of antennas.

16. The method of claim 12 further comprising:

the transmitting of the data packet includes:

receiving a baseband signal that includes the data packet;

receiving a carrier signal;

modulating the baseband signal by the carrier signal to produce an output signal; and applying the optimal set of transmitter antenna array coefficients to the output signal to produce the RF signal.

17. The method of claim 12, wherein the determining of the optimal set of transmitter antenna array coefficients associated with beamforming to target the destination receiver circuit includes determining, based on the training signal, a respective set of transmitter antenna array coefficients for each of a plurality of receiver circuits that includes the destination receiver circuit.

18. The method of claim 12, wherein the transmitting of the data packet as the RF signal using frequency division multiplexing.

* * * * *